(12) United States Patent
Guzallis

(10) Patent No.: US 8,099,878 B2
(45) Date of Patent: Jan. 24, 2012

(54) ELECTRICAL BOX TEMPLATE

(76) Inventor: Jon Guzallis, Niantic, CT (US)

( * ) Notice: Subject to any disclaimer, the term of this patent is extended or adjusted under 35 U.S.C. 154(b) by 0 days.

(21) Appl. No.: 12/589,231

(22) Filed: Oct. 19, 2009

(65) Prior Publication Data

US 2010/0037475 A1 Feb. 18, 2010

Related U.S. Application Data

(63) Continuation-in-part of application No. 12/151,750, filed on May 7, 2008, now abandoned.

(51) Int. Cl.
*G01D 21/00* (2006.01)

(52) U.S. Cl. .......................................................... 33/528

(58) Field of Classification Search .................... 33/528, 33/DIG. 10
See application file for complete search history.

(56) References Cited

U.S. PATENT DOCUMENTS

| | | | | |
|---|---|---|---|---|
| 1,392,360 A * | 10/1921 | Searle | ............................. | 33/528 |
| 2,733,513 A * | 2/1956 | Gatineau | ........................ | 33/528 |
| 4,259,785 A * | 4/1981 | Wortham | ........................ | 33/528 |
| 4,888,880 A * | 12/1989 | Parker | ............................ | 33/645 |
| 5,813,130 A * | 9/1998 | MacDowell | .................... | 33/528 |
| 5,860,219 A * | 1/1999 | Wilkinson | ....................... | 33/528 |
| 6,209,214 B1 * | 4/2001 | Talavera | ......................... | 33/528 |
| 6,708,421 B1 * | 3/2004 | Crorey | ............................ | 33/613 |
| 6,810,598 B2 * | 11/2004 | Boys | ............................... | 33/528 |
| 6,842,993 B1 * | 1/2005 | DiMauro | ........................ | 33/528 |
| 7,134,217 B2 * | 11/2006 | Melittas | .......................... | 33/528 |
| 7,373,730 B2 * | 5/2008 | Murphy | .......................... | 33/528 |
| 7,392,594 B2 * | 7/2008 | Kesler | ............................ | 33/528 |
| 7,402,748 B1 * | 7/2008 | Gretz | .............................. | 33/528 |
| 7,434,327 B2 * | 10/2008 | Crorey | ........................... | 33/528 |
| 7,511,218 B2 * | 3/2009 | Kearney | | |
| 2004/0083617 A1 * | 5/2004 | Bielen | ............................ | 33/528 |
| 2004/0244212 A1 * | 12/2004 | Melittas | .......................... | 33/528 |
| 2006/0000100 A1 * | 1/2006 | Melittas | .......................... | 33/528 |
| 2009/0277029 A1 * | 11/2009 | Guzallis | ......................... | 33/528 |

* cited by examiner

*Primary Examiner* — Yaritza Guadalupe-McCall
(74) *Attorney, Agent, or Firm* — Tobin, Carberry, O'Malley, Riley, Selinger

(57) ABSTRACT

An electrical box template, an electrical box template extension device and a method for utilizing the electrical box template and an electrical box template extension device is provided and includes a template body having a template perimeter, a template back and a template front, wherein the template front includes, a front surface protruding from the template front and located adjacent at least a portion of the template perimeter, a centering structure located in a center portion of the template body and defining a centering orifice and at least one interior support located between said centering structure and the protruding front surface.

18 Claims, 11 Drawing Sheets

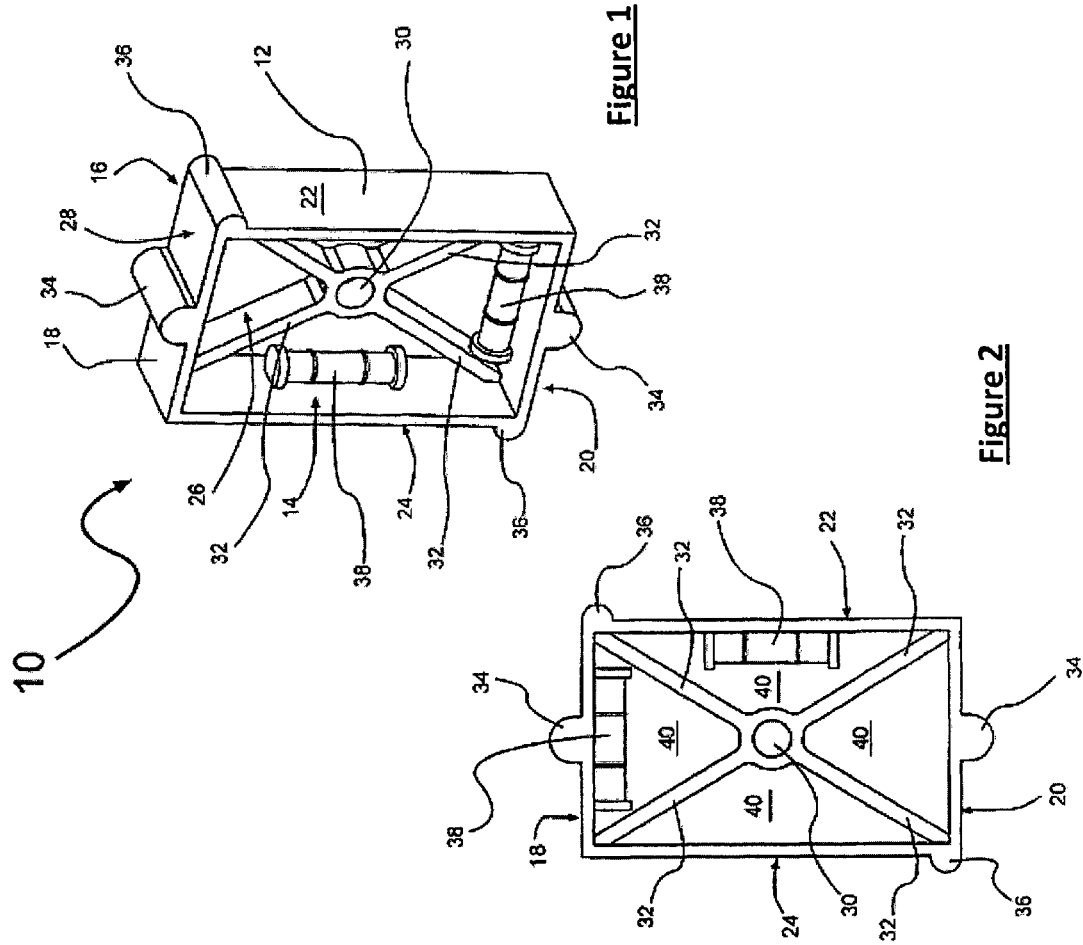

ELECTRICAL BOX TEMPLATE

RELATED APPLICATIONS

This application is a Continuation-In-Part of, and claims benefit of, U.S. Utility patent application Ser. No. 12/151,750 filed May 7, 2008, now abandoned the contents of which are incorporated by reference herein it its entirety.

BACKGROUND OF THE INVENTION

When remodeling or constructing homes, offices and commercial buildings, electrical outlet boxes and switch boxes are installed throughout the structure. Many times the boxes are usually installed on a stud at a uniform distance from the floor and in a uniform location along the stud. Sheet rock (or drywall or other wall material) is generally installed on the walls in preparation for finishing the rooms. When the sheet rock is installed the boxes are then covered. The builder must then make an opening in the sheet rock and cut the opening appropriately for installing the outlets or switches within the boxes.

When the builder begins to shape the opening for receiving the outlets or switches, the builder spends time shaving away at the opening to make the appropriate shape. This takes time and effort to match the shapes. Likewise, if the builder is not skilled, mistakes can happen causing the opening to be larger than the box, off center from the box, or smaller than the box. In each of these situations, the builder needs to spend time and money to repair the mistake.

What is needed in the art is an electrical box template that is sized appropriate, aids in assuring alignment of the opening, and provides a centering point for proper location of the opening.

SUMMARY OF THE INVENTION

An electrical box template is provided and includes a template body having a template perimeter, a template back and a template front, wherein the template front includes, a front surface protruding from the template front and located adjacent at least a portion of the template perimeter, a centering structure located in a center portion of the template body and defining a centering orifice and at least one interior support located between said centering structure and the protruding front surface.

An electrical box template extension device is also provided and includes an electrical box template extension device configured to associate with an electrical box template, the electrical box template extension device including, a device body having a device perimeter, a device back and a device front, wherein the device front includes, a device front surface defining a device centering orifice and including a template interface portion defining an interface portion cavity, the template interface portion located adjacent the device perimeter, wherein the template interface portion cavity is sized and shaped similarly to the front surface protruding from the template front, such that when the electrical box template extension device is associated with the electrical box template, a portion of the front surface protruding from the template front is located within the template interface portion cavity.

A method of utilizing an electrical box template is also provided, wherein the electrical box template includes a template body having a template perimeter, a template back and a template front, wherein the template front includes, a front surface protruding from the template front and located adjacent at least a portion of the template perimeter, a centering structure located in a center portion of the template body and defining a centering orifice, at least one interior support located between the centering structure and the protruding front surface and a plurality of levels. The method includes positioning the electrical box template against a surface, such that the template back contacts the surface, aligning the centering orifice with a predetermined electrical box mounting location, wherein the predetermined electrical box mounting location is visible through the centering orifice, adjusting a position of the electrical box template to center the electrical box template on the surface, tracing around an exterior of the electrical box template with a writing implement and removing the electrical box template from the surface.

BRIEF DESCRIPTION OF THE FIGURES

The foregoing and other features and advantages of the present invention will be more fully understood from the following detailed description of illustrative embodiments, taken in conjunction with the accompanying drawings in which like elements are numbered alike:

FIG. 1 is a perspective view of an exemplary embodiment of the electrical box template.

FIG. 2 is a front view of an exemplary embodiment of the electrical box template.

DETAILED DESCRIPTION

Figure 3:
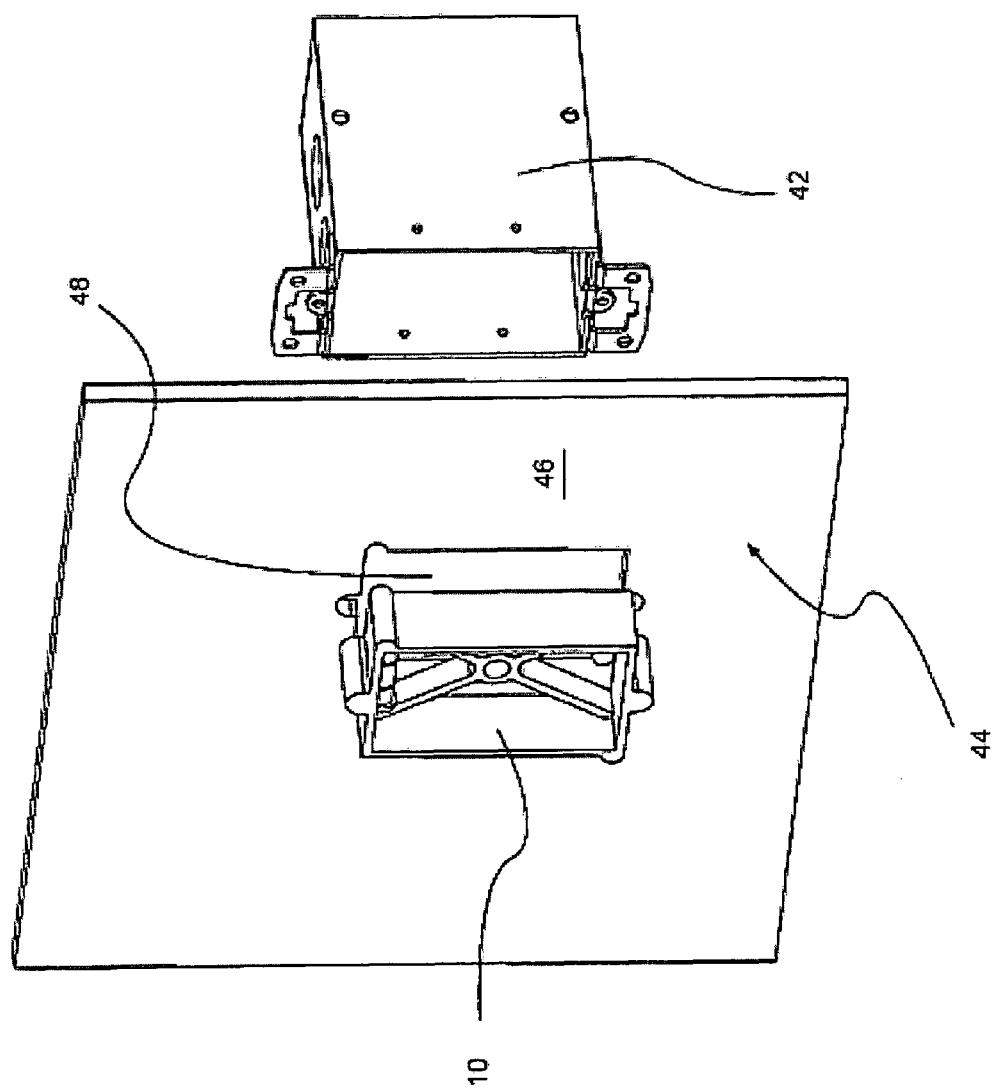
FIG. 3 is a perspective view of an exemplary embodiment of the use of the electrical box template with a wall and an electrical box.

Persons of ordinary skill in the art will realize that the following disclosure is illustrative only and not in any way limiting. Other embodiments of the disclosure will readily suggest themselves to such skilled persons having the benefit of this disclosure.

The present disclosure is an electrical box template that can be utilized to accurately position an opening in a wall for an electrical box. The template is positioned centrally in the desired location using the centering orifice and levels the electrical box template using the levels. The user can then trace around the exterior of the electrical box template, marking the shape on the wall. The user can then cut out the shape for accessing the electrical box disposed in the interior of the wall.

Referring to FIGS. 1 and 2, a perspective front view of an exemplary electrical box template 10 is illustrated in FIG. 1 and a front view of the electrical box template 10 is illustrated in FIG. 2. The electrical box template 10 includes a body 12 having a front 14 opposite a back 16, a first side 18 opposite a second side 20, a third side 22 opposite a fourth side 24, and an interior 26 opposite and exterior 28. A centering orifice 30 is located in the body 12, preferably in the center of the body 12. Interior supports 32 are diagonally positioned in the interior 26 of the body 12 and are configured to house the centering orifice 30.

The body 12 has alignment protrusions 34 extending from the first side 18 and the second side 20 with projections 36 extending from the corner of the first side 18 and the third side 22 and the corner of the second side 20 and the fourth side 24.

The centering orifice 30 is centrally located in the electrical box template 10 for positioning purposes. The centering orifice 30 is essentially an opening in the body 12 that extends from the front 14 to the back 16 of the body 12. The centering orifice 30 can be used to see a measurement location or to place an implement (i.e., pencil, screwdriver, etc.) through. The centering orifice 30 is also located centrally of the interior supports 32. In a preferred embodiment, the interior supports 32 extend from the corners of the interior 26 of the electrical box template 10 towards the centrally located centering orifice 30. The interior supports 32 form an "X" leaving voids 40 for the user to position his/her fingers around the centering orifice 30 (i.e., like a handle) and along the interior supports 32 for locating the appropriate measurement location on the wall 44 and for leveling the electrical box template 10. Although four interior supports 32 are illustrated, it is contemplated to have at least one interior support 32. The interior supports 32 can operate as a handle for the user when utilizing the electrical box template 10.

The alignment protrusions 34 are configured to coincide with the holes on an electrical box located within the interior of the wall. The location of the alignment protrusions 34 match the location of holes to which an outlet, for example, would be attached with an appropriate attachment means (e.g., a screw). The projections 36 are configured to coincide with the holes on an electrical box that can be coupled to another electrical box to create a series of electrical boxes coupled together (i.e., gangable). Similar to the alignment protrusions 34, the locations of the projections 36 match the holes for attaching the electrical box to another electrical box.

The levels 38 are coupled to the interior 26 of at least two of the side walls 18, 20, 22, and 24. Preferably, at least one level 38 is coupled in a vertical position and another level 38 is coupled in a horizontal position. The positioning of the levels 38 is designed for centering the template in the proper location. The levels 38 can be any conventional level that is easily read and can be easily installed in the interior 26 of the electrical box template 10.

The electrical box template 10 is shaped to resemble the opening of a conventional electrical box (see FIG. 3) and preferably of similar size. In a preferred embodiment, the electrical box template 10 is about 2 inches in width and about 3 inches in length. The electrical box template 10 should be thick enough to house the levels, with a preferred thickness of about ½ inch to about 1 inch. The electrical box template 10 can be comprised of any sturdy material including, but not limited to, plastic, metal, wood, composites, and combinations thereof, and the like. It is contemplated that the electrical box template 10 is comprised on one piece of material with appropriate areas (i.e., voids, centering orifice, etc.) cut out and levels separately attached.

In use, the user (i.e., builder, homeowner, handyman, etc.) measures the appropriate distance from the floor and from the side to acquire a measurement location (or chamfer or predetermined electrical box mounting location). The measurement location denotes the position of the electrical box 42 in the interior of the wall 44 behind the wall material 46. The user then positions the electrical box template 10 against a surface, such as the wall 44. The user lines up the measurement location (i.e. predetermined electrical box mounting location) in the centering orifice 30 so that the measurement location is visible to the user. The user then rotates or adjusts the electrical box template 10 while noting the readings of the levels 38 to correctly center the electrical box template 10 on the wall. The user can rotate the electrical box template 10 by holding the exterior of the electrical box template 10 or by gripping the interior supports 32 that can act as handles. The user then traces with a writing implement (i.e., pencil, pen, and the like) around the exterior 28 of the electrical box template 10. After removing the electrical box template 10 from the wall 44, the user cuts out the wall material 46 to reveal a cutout 48 that properly matches the electrical box 42. Although a wall 44 is described it is contemplated that the electrical box template 10 can be utilized with any surface (i.e., walls, floors, ceilings, and the like) that requires an opening for an electrical box 42.

The electrical box template 10 is lightweight, easily used and can fit in any conventional tool belt or tool box. The user can utilize the opening for centering of the electrical box template 10 to achieve a properly positioned opening every time.

Figure 4:
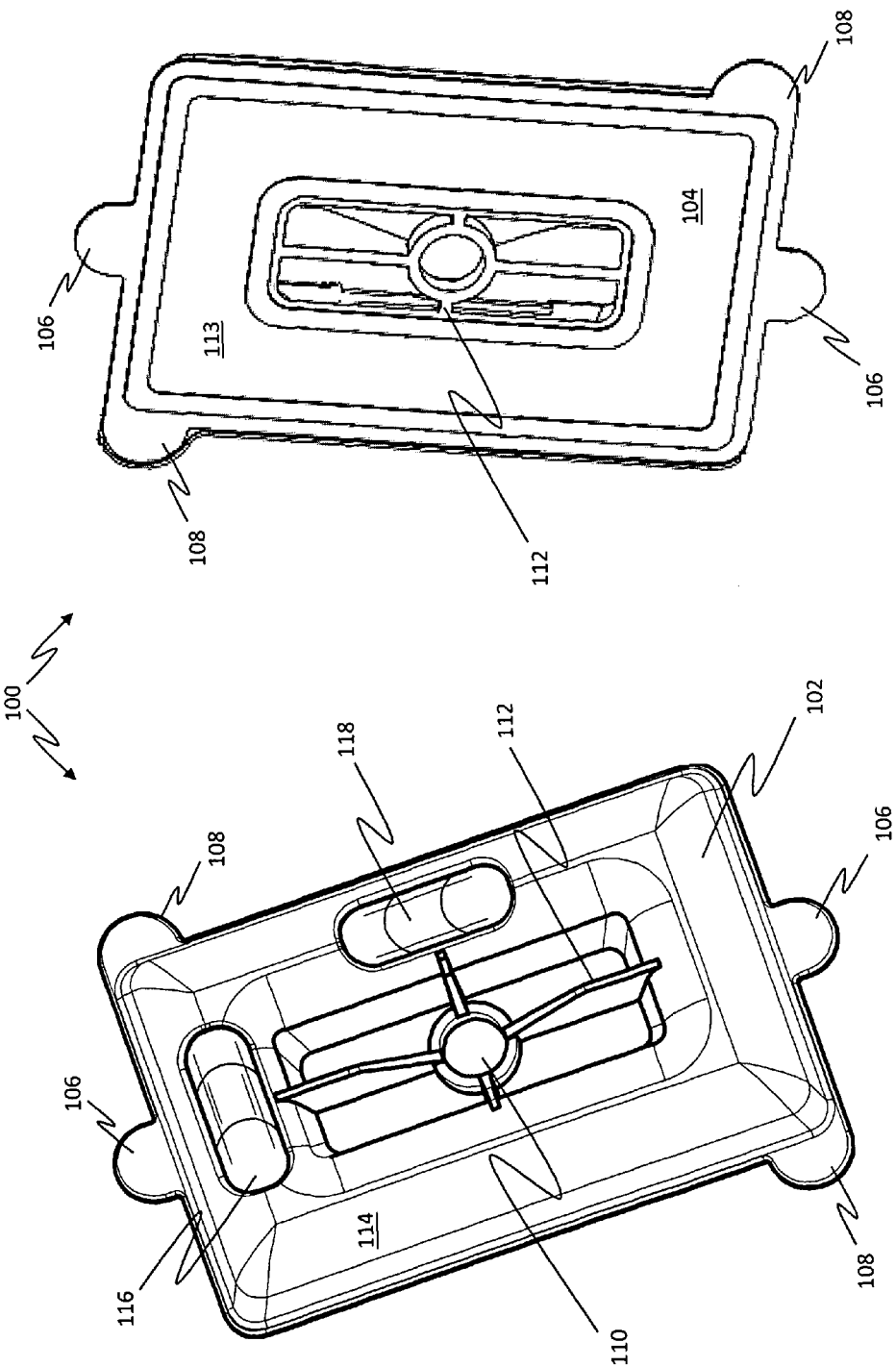
FIG. 4A is a front perspective view of an additional embodiment of the electrical box template.
FIG. 4B is a rear perspective view of the electrical box template of FIG. 4A.
Figure 12:
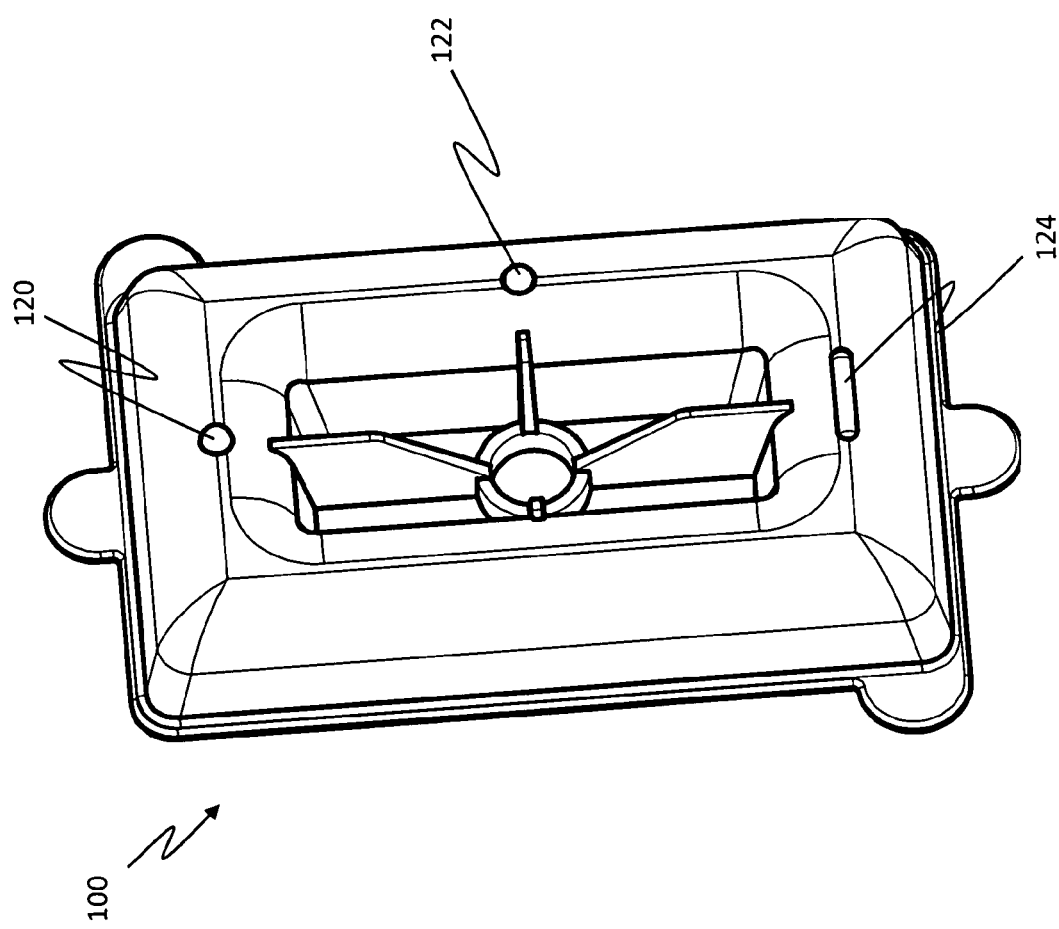
FIG. 12 is a front perspective view of the electrical box template of FIG. 4A with digital levels and digital stud finder.

Referring to FIG. 4A and FIG. 4B, an additional embodiment of an electrical box template 100 is shown and includes a template body having a template perimeter, a front portion 102 and a rear portion 104. Similar to the previous embodiment of electrical box template 10, electrical box template 100 includes alignment protrusions 106 and projection tabs 108 and is shaped and sized to resemble the opening of a conventional electrical box. The electrical box template 100 also includes a centering structure 110 defining a centering orifice and at least one interior support 112. As above, the rear portion 104 is configured to lay against a wall surface where the user then traces with a writing implement (i.e., pencil, pen, and the like) around the exterior of the electrical box template 100. It is contemplated that the rear portion 104 may include a rubber or other non-slip surface 113 so that the electrical box template 100 does not slip when being traced. As shown, the front portion 102 includes a front surface 114 which protrudes from the front portion 102 and which is substantially arched shaped. It should be appreciated that although the front surface 114 is shown as having a portion that is substantially arch shaped and that surrounds the entire perimeter of front portion 102, it is contemplated that the portion of the front surface 114 may be of any shape, such as square, rectangular, triangular, etc., and may be located in only limited locations on the front surface 114. Moreover, as with the previous embodiment, the electrical box template 100 also includes at least one of a horizontal level 116 and/or a vertical level 118. It is contemplated that while one or both of the horizontal level 116 and/or vertical level 118 may be manual liquid bubble levels (as shown in FIGS. 4A and 4B), a digital horizontal level 120 and/or a digital vertical level 122 may also be incorporated, as shown in FIG. 12. Also, as shown in FIG. 12, a digital stud finder 124 may be included. It is contemplated that either manual and/or electronic levels and/or stud finding devices may be used. As is known, typically digital levels work via an LED that lights up as an indicator when the electrical box template 100 is vertically and/or horizontally level. Similarly, the digital stud finder works via an LED that lights up and becomes brighter (or via a sound that becomes louder) responsive to the location of the finder to a stud. While the disclosure illustrates these types of digital levels and stud finders, any type of levels or stud finders (digital and/or manual) suitable to the desired end purpose may be used.

Figure 5:
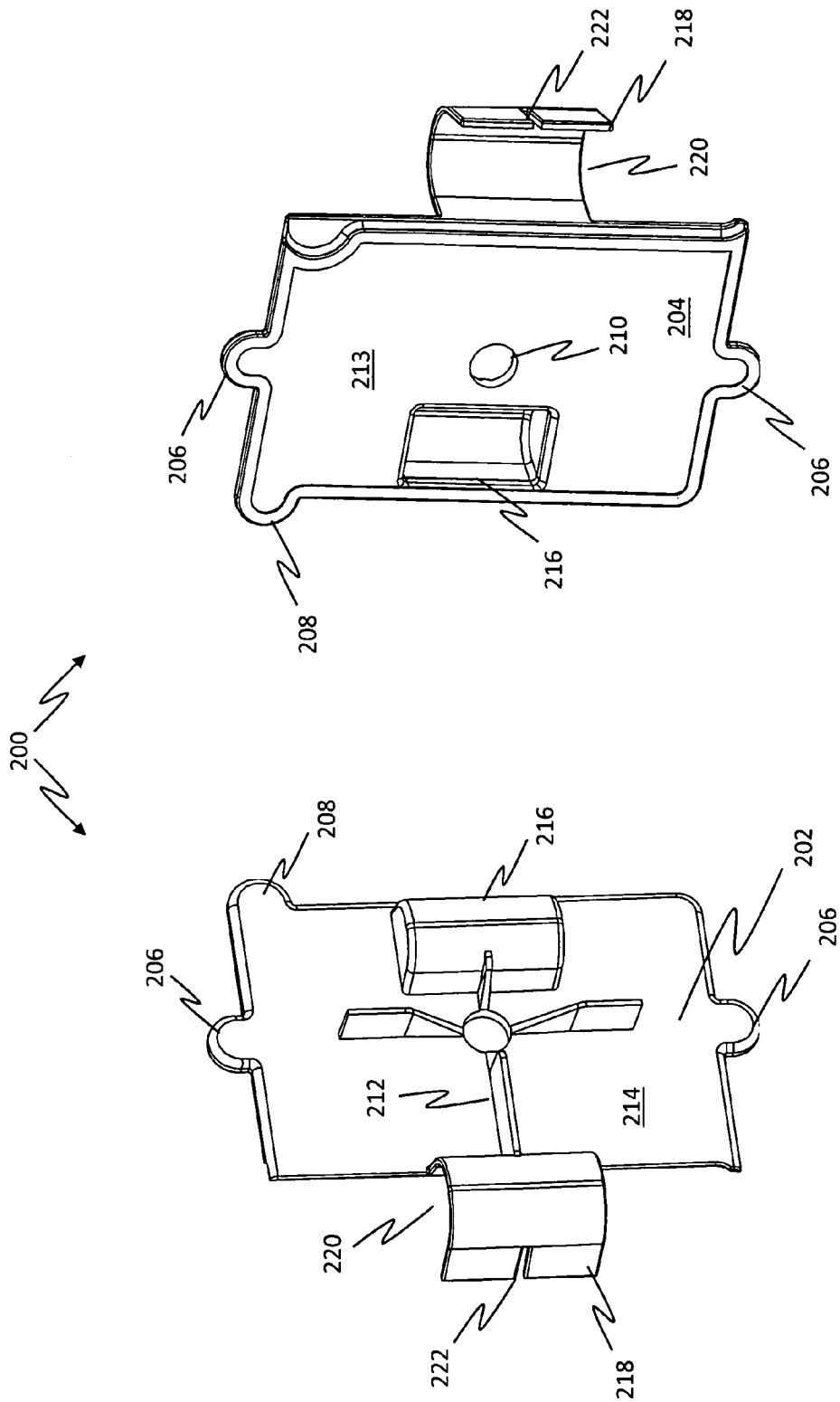
FIG. 5A is a front perspective view of an electrical box template extension device for use with the electrical box template of FIG. 4A.
FIG. 5B is a rear perspective view of an electrical box template extension device for use with the electrical box template of FIG. 4A.

Referring to FIG. 5A and FIG. 5B, an electrical box extension template 200 is shown and includes a template extension body having an extension template perimeter, an extension template front portion 202 and an extension template rear portion 204. Similar to the embodiments of the electrical box template 10, 100, electrical box extension template 200 includes alignment protrusions 206 and projections 208 and is shaped and sized to resemble the opening of a conventional electrical box. The electrical box extension template 200 also includes a centering structure defining a centering orifice 210 and at least one interior support 212. As above, the extension template rear portion 204 is configured to lay against a wall surface where the user then traces with a writing implement (i.e., pencil, pen, and the like) around the exterior of the electrical box extension template 200. It is contemplated that the extension template rear portion 204 may include a rubber or other non-slip surface 213 so that the electrical box extension template 200 does not slip when being traced. As shown, the extension template front portion 202 includes a front surface 214 having a protruding portion 216 and a template interface portion 218, both of which are similarly sized and shaped (in this case both are substantially arch shaped). The template interface portion 218 defines a cavity 220 sized and shaped similarly to the front surface 114 and includes a notched portion 222, such that when the electrical box extension template 200 is associated with the electrical box template 100 (or a like electrical box extension template 200), the front surface 114 (or the protruding portion 216) is located with the cavity 220. Accordingly, the electrical box extension template 200 is configured to associate with either a like electrical box extension template or with an electrical box template 100 as described herein.

Figure 6:
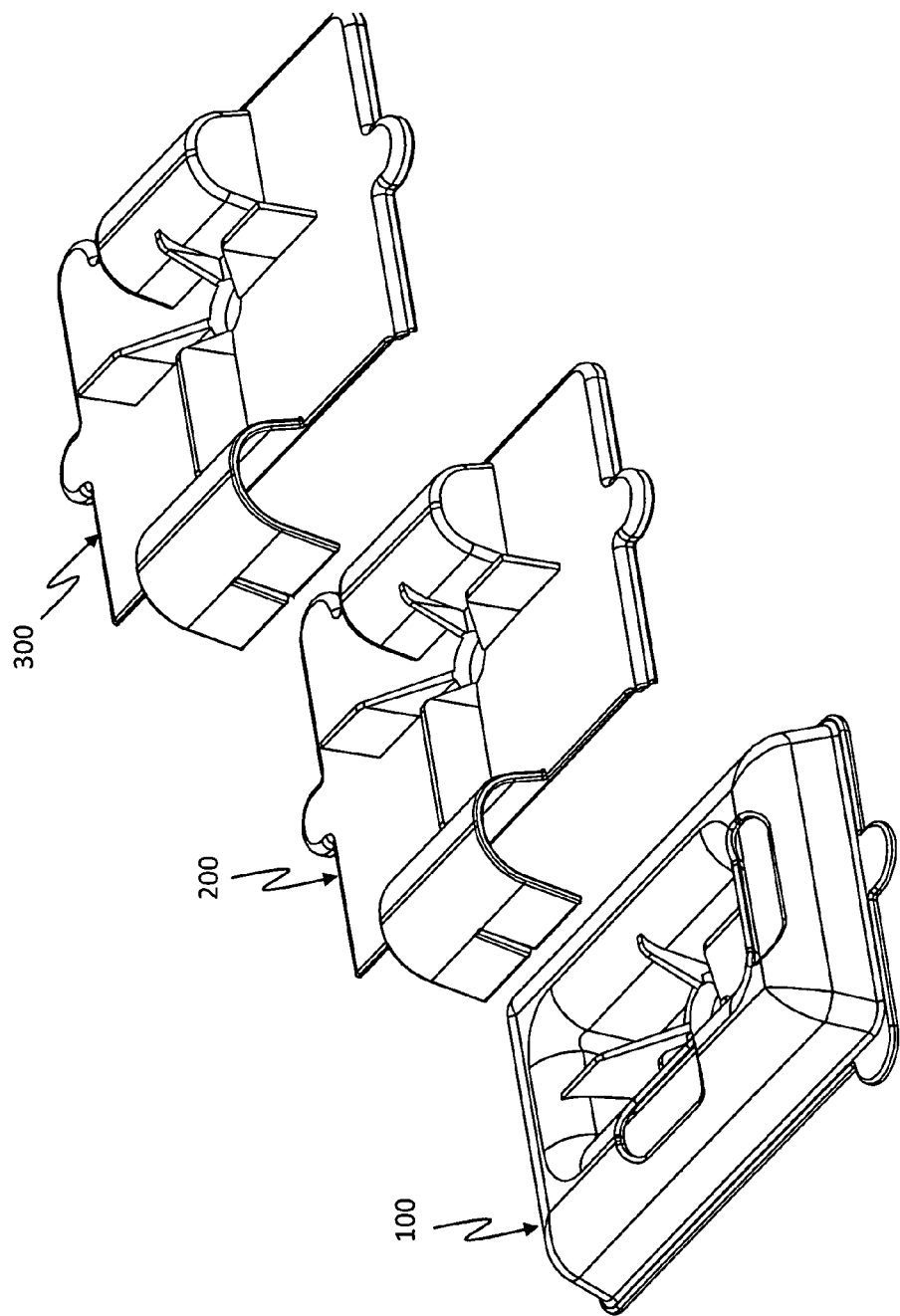
FIG. 6 is a perspective view of the electrical box template of FIG. 4A being associated with a plurality of the electrical box template extension device of FIG. 5A.
Figure 7:
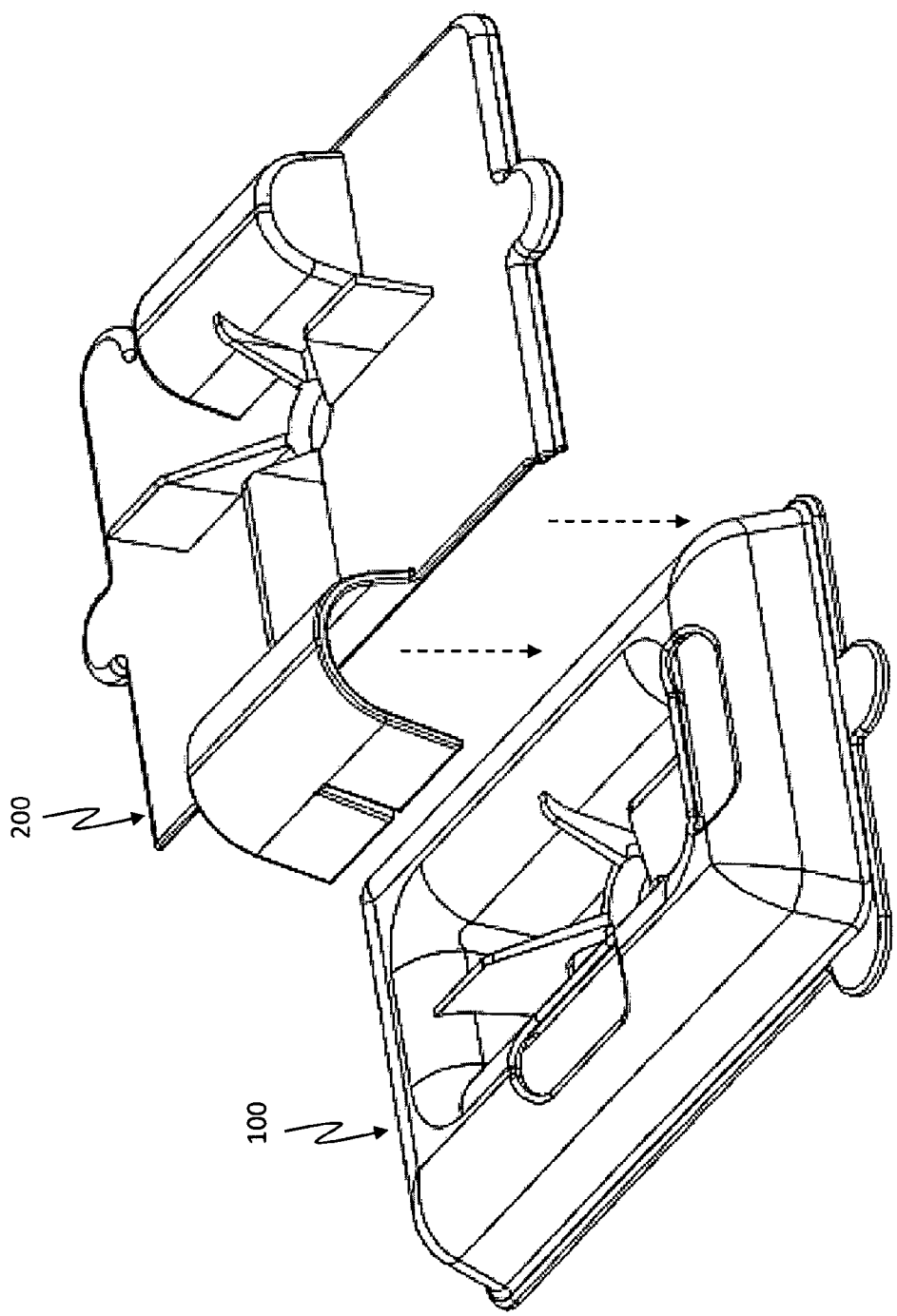
FIG. 7 is a perspective view of the electrical box template of FIG. 4A being associated with the electrical box template extension device of FIG. 5A.
Figure 8:
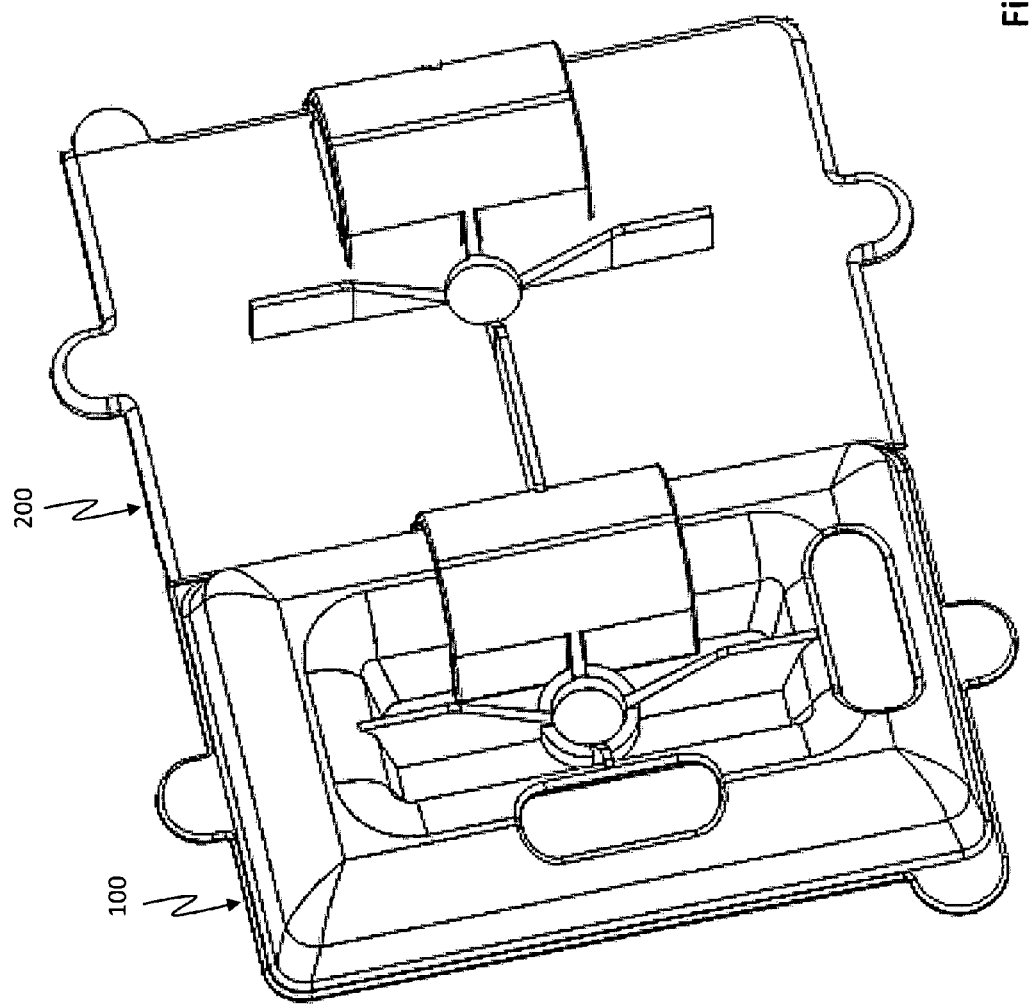
FIG. 8 is a perspective view of the electrical box template of FIG. 4A associated with one electrical box template extension device of FIG. 5A.
Figure 9:
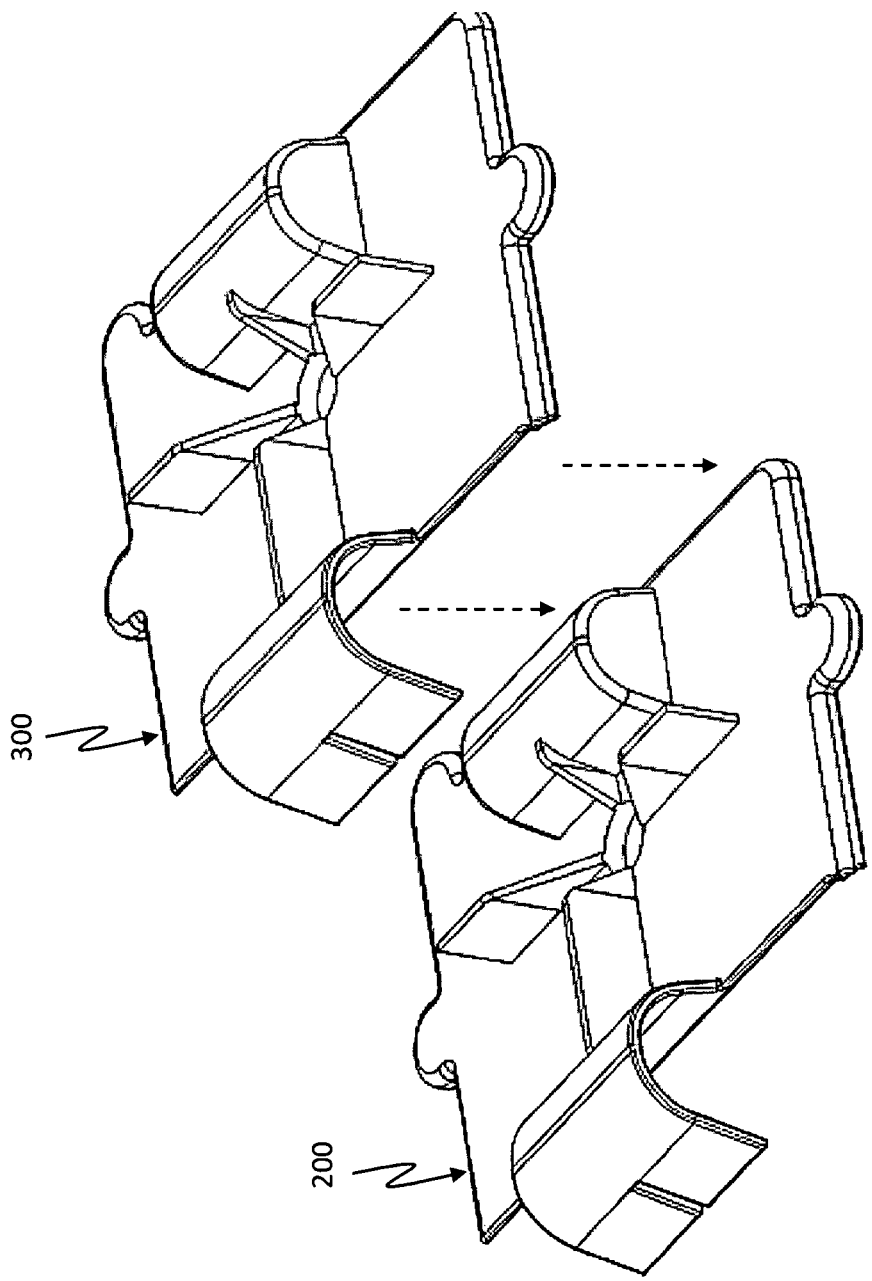
FIG. 9 is a perspective view of the electrical box template extension device of FIG. 5A being associated with a like electrical box template extension device.
Figure 10:
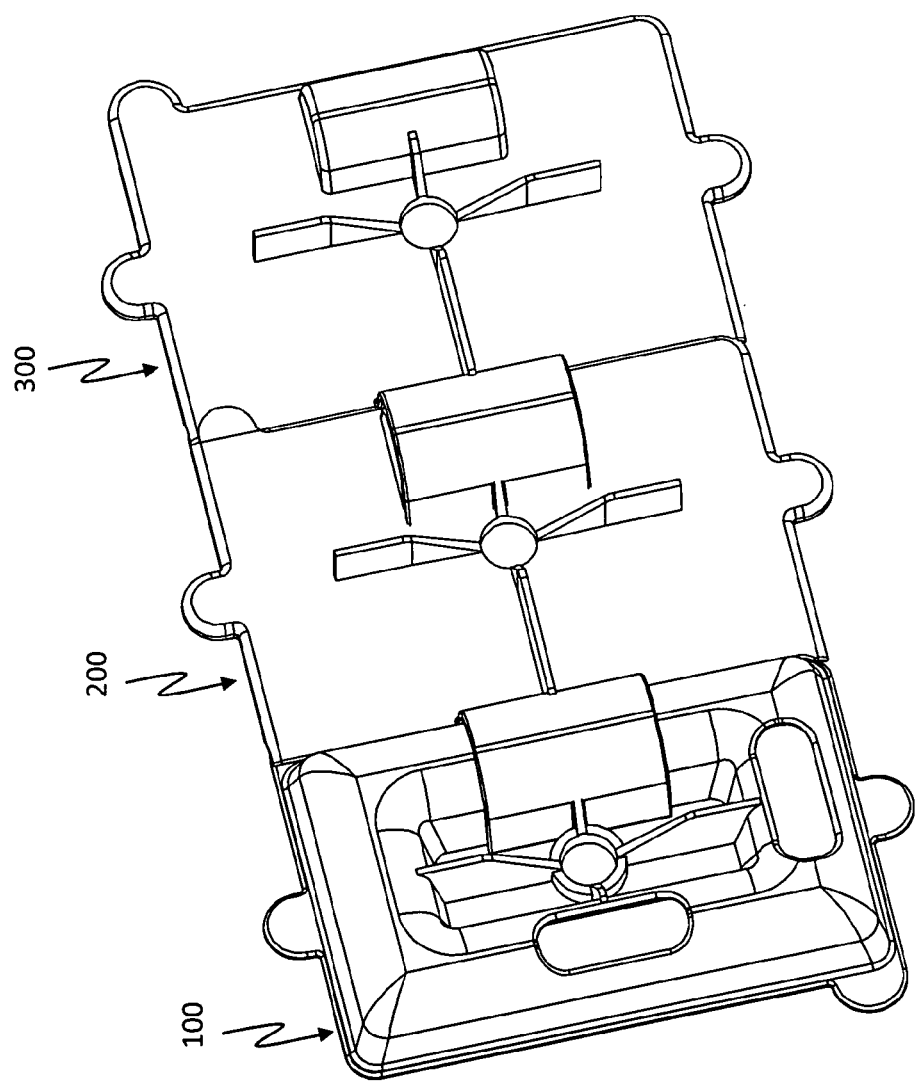
FIG. 10 is a front perspective view of the electrical box template of FIG. 4A associated with a plurality of electrical box template extension devices of FIG. 5A.
Figure 11:
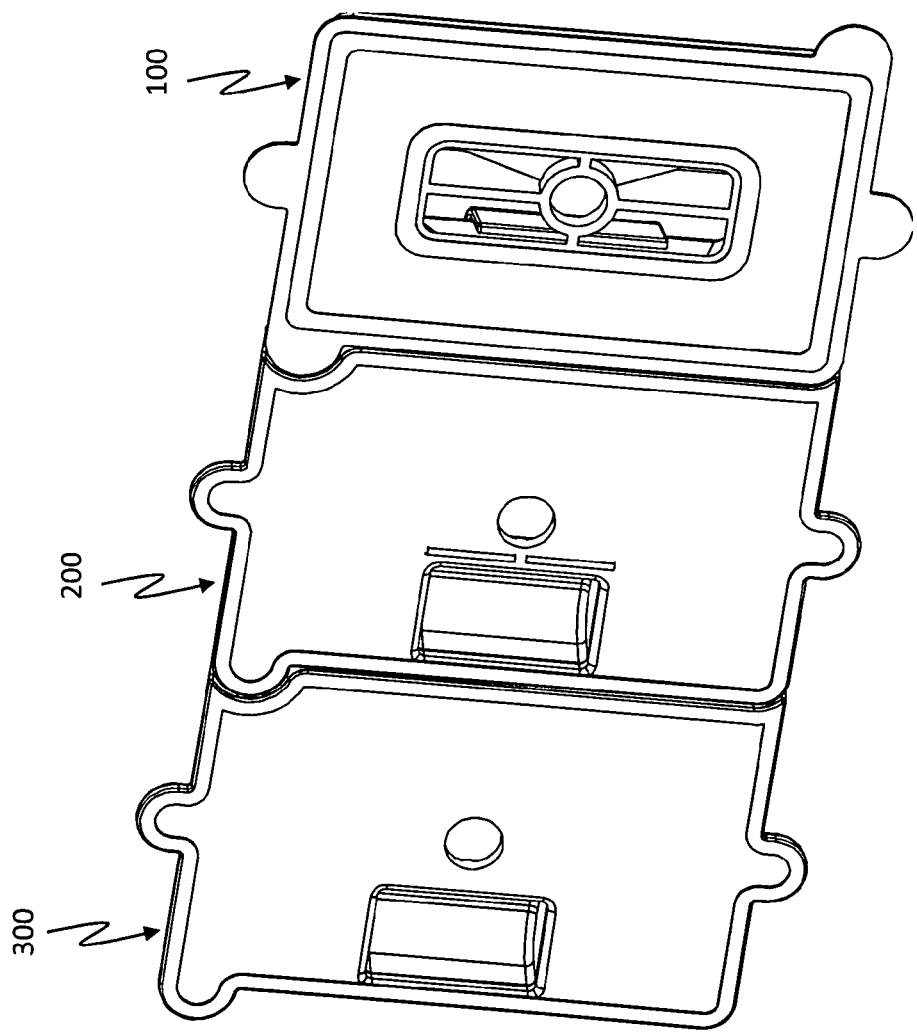
FIG. 11 is a rear perspective view of the electrical box template of FIG. 4A associated with a plurality of electrical box template extension devices of FIG. 5A.

Referring to FIG. 6, an electrical box template 100 and two electrical box extension templates 200, 300 are shown being associated together. As shown in FIG. 7 and FIG. 8, a first electrical box extension template 200 is shown being associated with electrical box template 100 such that the template interface portion 218 of first electrical box extension template 200 is located over the front surface 114 of the electrical box template 100, wherein a portion of the interior supports 112 of electrical box template 100 is located within the notched portion 222 of the first electrical box extension template 200. It should be appreciated that front surface 114 of the electrical box template 100 and the template interface portion 218 of first electrical box extension template 200 may be sized and shaped to snugly fit together. Additionally, a locking mechanism may be included to prevent the front surface 114 and the template interface portion 218 from separating inadvertently. If desired, additional extension templates could be added on as desired. For example, as shown in FIG. 9, FIG. 10 and FIG. 11, a second electrical box extension template 300 is shown being associated with the first electrical box extension template 200 such that the template interface portion 318 of second electrical box extension template 300 is located over the front surface 214 of the first electrical box extension template 200, wherein a portion of the interior supports 212 of first electrical box extension template 200 is located within the notched portion 322 of the second electrical box extension template 300. As above, it should be appreciated that front surface 214 of the first electrical box extension template 200 and the template interface portion 318 of second electrical box extension template 300 may be sized and shaped to snugly fit together (or via a locking mechanism).

While the invention has been described with reference to an exemplary embodiment, it will be understood by those skilled in the art that various changes, omissions and/or additions may be made and equivalents may be substituted for elements thereof without departing from the spirit and scope of the invention. It is contemplated that elements and characteristics of the above disclosed embodiments may be mixed among the different disclosed embodiments as desired. For example, elements and/or characteristics of electrical box template 10 may be incorporated into electrical box template 100 and/or vice versa. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. An electrical box template comprising:
   a template body having a template perimeter, a template back and a template front, wherein said template front includes,
   a front surface protruding from said template front and located adjacent at least a portion of the template perimeter;
      a centering structure located in a center portion of said template body and defining a centering orifice; and
      at least one interior support located between said centering structure and said protruding front surface, wherein the template body is configured to connect with an electrical box template extension device having a template interface portion that is configured to associate with a portion of the template perimeter.

2. The electrical box template of claim 1, wherein said electrical box template extension device includes,
   a device body having a device perimeter, a device back and a device front, wherein said device front includes,
   a device front surface defining a device centering orifice, wherein said template interface portion is associated with said device front surface, said template interface portion defining an interface portion cavity, said template interface portion located adjacent said device perimeter, wherein said template interface portion cavity is sized and shaped similarly to said front surface protruding from said template front, such that when the electrical box template extension device is associated with the electrical box template, a portion of said front surface protruding from said template front is located within said template interface portion cavity.

3. The electrical box template of claim 2, wherein said template interface portion further includes an interface portion notch sized and shaped similarly to at least a portion of said at least one interior support, such that when the electrical box template extension device is associated with the electrical box template, at least a portion of said at least one interior support is located within said interface portion notch.

4. The electrical box template of claim 3, wherein the electrical box template extension device further includes,
a device protruding portion located adjacent said device perimeter opposite said template interface portion, said device protruding portion being sized and shaped such that when the electrical box template extension device is associated with a like electrical box template extension device, said device protruding portion is located within the interface portion cavity and said at least a portion of said at least one interior support is located within said interface portion notch of the like electrical box template extension device.

5. The electrical box template of claim 1, further comprising at least one alignment protrusion and at least one projection tab.

6. The electrical box template of claim 1, further comprising at least one of at least one level sensing device and a stud finding device.

7. The electrical box template of claim 6, wherein said at least one level sensing device includes at least one of a horizontal level sensing device and a vertical level sensing device.

8. An electrical box template extension device comprising:
an electrical box template extension device configured to associate with an electrical box template, said electrical box template extension device including,
a device body having a device perimeter, a device back and a device front, wherein said device front includes,
a device front surface defining a device centering orifice and including a template interface portion defining an interface portion cavity, said template interface portion located adjacent said device perimeter, wherein said template interface portion cavity is sized and shaped similarly to said front surface protruding from said template front, such that when the electrical box template extension device is associated with the electrical box template, a portion of said front surface protruding from said template front is located within said template interface portion cavity.

9. The electrical box template extension device of claim 8, wherein said template interface portion further includes an interface portion notch sized and shaped similarly to at least a portion of said at least one interior support, such that when the electrical box template extension device is associated with the electrical box template, at least a portion of said at least one interior support is located within said interface portion notch.

10. The electrical box template extension device of claim 9, further including,
a device protruding portion located adjacent said device perimeter opposite said template interface portion, said device protruding portion being sized and shaped such that when the electrical box template extension device is associated with a like electrical box template extension device, said device protruding portion is located within the interface portion cavity and said at least a portion of said at least one interior support is located within said interface portion notch of the like electrical box template extension device.

11. The electrical box template extension device of claim 8, further comprising at least one alignment protrusion and at least one projection tab.

12. The electrical box template extension device of claim 8, further comprising at least one of at least one level sensing device and a stud finding device.

13. The electrical box template extension device of claim 12, wherein said at least one level sensing device includes at least one of a horizontal level sensing device and a vertical level sensing device.

14. A method of utilizing an electrical box template, wherein the electrical box template includes a template body having a template perimeter, a template back and a template front, wherein the template front includes, a front surface protruding from the template front and located adjacent at least a portion of the template perimeter, a centering structure located in a center portion of the template body and defining a centering orifice, at least one interior support located between the centering structure and the protruding front surface and a plurality of levels, wherein the template body is configured to connect with an electrical box template extension device having a template interface portion that is configured to associate with a portion of the template perimeter, the method comprising:
positioning the electrical box template against a surface, such that the template back contacts said surface;
aligning the centering orifice with a predetermined electrical box mounting location, wherein said predetermined electrical box mounting location is visible through the centering orifice;
adjusting a position of the electrical box template to center the electrical box template on the surface;
tracing around an exterior of the electrical box template with a writing implement; and
removing the electrical box template from said surface.

15. The method of claim 14, wherein said surface is a wall.

16. The method of claim 14, further comprising:
at least one alignment protrusion; and
at least one projection.

17. The method of claim 14, wherein said centering orifice extends from said template front to said template back.

18. The method of claim 14, wherein at least one of said plurality of levels is positioned vertically on said template body and at least one of said plurality of levels is positioned horizontally on said template body.

* * * * *